United States Patent Office 3,198,691
Patented Aug. 3, 1965

3,198,691
BEARING MATERIALS AND PRODUCT
Percival Edward Thomas, Ashtead, and Norman Arthur Gardiner, Wibsey, Bradford, England, assignors to British Belting & Asbestos Limited, Cleckheaton, York, England, a British company
No Drawing. Filed Oct. 18, 1961, Ser. No. 145,985
Claims priority, application Great Britain, Oct. 27, 1960, 36,966/60; Aug. 18, 1961, 29,920/61 and 29,921/61
26 Claims. (Cl. 161—184)

This invention relates to bearing materials and to plain bearings incorporating such materials. The term "plain bearings" means a surface upon which another surface can move in direct sliding contact (subject to any intervening lubrication) for example, journal bearings, thrust washers and slide rests for machine tools. The invention is concerned with the utilisation, in bearings, of the recognised low friction properties of the fluorocarbon resins particularly polytetrafluoroethylene which is the most usual of the fluorocarbon resins to be employed for low friction purposes, and which will hereinafter be abbreviated as P.T.F.E. The term "fluorocarbon resin" is employed in this specification and in the appended claims, it is intended to include all the polymerised materials obtained by the polymerisation of ethylenically unsaturated fluorocarbons together with partially substituted fluorocarbons, and perfluorocarbons.

It has already been proposed to manufacture bearings by the preparation of a porous matrix with subsequent impregnation with a P.T.F.E. dispersion. These bearings have limitations in that if reasonable strength is to be realized the P.T.F.E. content must be low and is usually limited to the surface layer of the bearing.

Surface paints consisting of a P.T.F.E. dispersion mixed with a resin dispersion or solution have also been proposed.

The present invention is distinguished from these prior proposals inter alia in that the P.T.F.E. resin is used in powder or granular form and is incorporated with an epoxy resin and if desired a filler in an early stage of the process of manufacture so that the P.T.F.E. is firmly incorporated in a cured epoxy resin matrix. This provides improved mechanical properties and enhanced wear resistance.

The invention is directed in particular to the provision of bearing moulded materials of the kind in which the low friction properties of the fluorocarbon resin are combined with an acceptable wear resistance for commercial usage, and which are adapted to be bonded to a separate backing.

Reference is made here to Patent 2,943,009 for general definition of the expression "epoxy resins."

The very low friction properties which make the fluorocarbon resins and particularly P.T.F.E. useful for bearing purposes, also tend to make them extremely difficult to retain in position or to attach to a backing; moreover, their strength and load carrying capacity are comparatively low and require reinforcement by other stronger materials.

According to the present invention there is provided a moulded composite bearing material made from fluorocarbon resin in powder or granular form comprising a fluorocarbon resin uniformly distributed through and firmly incorporated in a cured epoxy resin matrix, the relative proportion of the fluorocarbon resin to matrix material and its distribution therein being such that the composite bearing material is susceptible to bonding to a support.

The fluorocarbon resin particularly P.T.F.E. may be admixed with the epoxy resin either when the epoxy resin is in the A stage or the B stage.

Whilst in some cases (e.g. where a moulded article is located within an enclosing housing under relatively light loading) the bearing material may be capable of being used by itself without being bonded to a support or backing, in the majority of uses it will be desirable to attach the bearing material to a support of stronger material so that it forms a low friction lining to the support. The bearing resulting from the attachment or bonding of this material to the support may be of any appropriate shape, according to the particular requirements of usage, and may be shaped by conventional means.

The material of the support or backing may vary widely according to the nature and loading of the bearing itself. For example it may be made of metal or of a suitable plastics material of adequate strength and rigidity, the plastics being reinforced if necessary. Alternatively, a flexible fabric backing may be employed, or a flexible backing of rubber or synthetic rubber.

In some methods of production it may be found necessary to expose the composite bearing material to temperatures high enough to sinter the fluorocarbon resin. For example, where P.T.F.E. is employed and the process involves sintering the P.T.F.E. partially or fully, a processing temperature within the range 300° to 380° C. is required.

The P.T.F.E. may be in the granular form in which it is normally supplied, but we have discovered that considerable advantages are obtained if P.T.F.E. in the moulded material is in a converted fibrous form since this will provide a more secure anchorage for the P.T.F.E. in the bearing material.

Certain forms of P.T.F.E., for example that sold under the trademark "FLUON CD.1" can be converted from granular to fibrous form when subjected to compaction and shearing forces during mixture with the epoxy resin at a temperature below the sintering temperature, which have the effect of re-orientating the material.

"FLUON CD.1" is the product of an aqueous dispersion polymerisation process which gives a P.T.F.E. dispersion which is coagulated to give "FLUON CD.1" as opposed to the P.T.F.E. powder produced by a granular polymerisation process (e.g. that sold under the trademark "FLUON G.1") which is found to be less easily processed by those methods of this invention which involve conversion to fibrous form.

Thus in a composite bearing material according to the present invention the P.T.F.E. may be in converted fibrous form.

In the following general description and in the later detailed examples, reference will be made throughout to the preferred form of the invention in which P.T.F.E. is the fluorocarbon resin, but such reference is not to be construed as limiting the invention to P.T.F.E.

When it is desired to use P.T.F.E. in its converted fibrous form, we have found that a very satisfactory method of producing the bearing material is to employ P.T.F.E. in granular or powder form and to subject it, during the process of mixture with the epoxy resin, to compacting and shearing forces at a temperature below its sintering temperature, whereby its conversion to fibrous form takes place concurrently with the mixing process.

The epoxy resin content of the composite bearing material is determined, to an important extent, by the particular method of production employed. For instance, a content of epoxy resin of 20% by weight can be produced by extrusion and calendering, but where a higher epoxy resin content of say 28–40% by weight is required to give a modified surfacing material with good adhesion to a backing material and good load-carrying properties an extrusion method is less advantageous: in such a case, instead of the extrusion process the powdered mixture may be fed directly into the nip of a sheeting mill; In the case where bonding to a backing is to take place, e.g. to a metal strip, to make composite strips for bearings, this may be done while feeding a metal backing strip simultaneously into the nip with the powders being fed on one side of it.

After sintering it has been found beneficial to cool under pressure. This can if desired be effected on a continuous basis by passing the composite strip between a series of rollers in graduated heating and cooling zones in a hot air oven.

In other cases the mixed material may be deposited on to a metal backing which has previously been coated with an adhesive, e.g. an epoxy resin, in order to improve adhesion and the metal backing if so desired may be preheated to melt the "B" stage epoxy resin on contact.

The addition of extra lubricant to the mix before sheeting in the mill or extrusion facilitates the sheeting or extrusion of the unsupported bearing material but necessitates removal of lubricant as by solvents before application to the metal backing.

The binder may be constituted by an epoxy resin loaded with a proportion of molybdenum-disulphide and thoroughly mixed after which a suitable curing agent is added: this epoxy resin system is then partly cured to the "B" stage where it becomes a solid and is then powdered. This powder will remelt and become fully cured to the "C" stage during subsequent processing.

Unsintered P.T.F.E. powder may be mixed with powdered epoxy resin in proportions to suit the service requirements of the finished bearing. For example this may be done as follows to produce a composite strip on a steel backing:

The P.T.F.E. and the binder powder are thoroughly mixed, extruded, and calendered to form a tape of say .005" thickness and this tape is laid on to a prepared steel strip; the steel strip and the tape are then passed through an oven which is heated up to the sintering temperature of the P.T.F.E. This will completely sinter the P.T.F.E. content of the tape. It will at the same time partly or completely cure the epoxy resin content of the tape, causing a strong adhesive bond between it and the backing strip.

The curing of the epoxy resin may, if necessary, be completed at a reduced temperature.

Employing a "B" stage epoxy resin mix such as Shell Epikote Resin 828 as the epoxy resin together with Shell Epikure D.D.M. (i.e., diamino diphenyl methane); or Shell Epikure M.P.D. (i.e., metaphenylenediamine) as hardening agents, the following stages of preparation have been found to provide good results.

(a) Preparation of the "B" stage resin mix.

(i) The curing agent is heated to 80°–100° C. and an approximately equal weight of epoxy resin is added, the mixture then being thoroughly mixed.

(ii) The remainder of the resin is then added and temperature maintained for 10 minutes. Fillers are added if required, and such fillers can be graphite, molybdenum disulphide, asbestos, or metal powders: the whole is then thoroughly mixed.

(iii) The mixture is now poured on to trays lined with cellophane sheet and either left overnight to gel or is heated for a further 10 minutes at 100° C. to gel on cooling.

(iv) The gelled resin is now broken up and disintegrated to the required particle size, care being taken to avoid excessive heating during disintegration.

(b) The "B" stage resin is blended with "FLUON CD.1" powder by gentle tumbling: a lubricating oil can be added at this stage to aid in subsequent operations but this oil must be leached out at a later stage and before bonding to the metal.

(c) The epoxy/P.T.F.E. mix is now ready for further processing. It may be pointed out that the "B" stage shelf-life of these systems is in excess of two weeks at room temperature. Cold storage increases the shelf-life.

Successful test samples have been produced by sheeting out the above mix and pressing it on to aluminium, aluminium alloy or steel sheet or strip at 2 tons/sq. inch for 10 minutes at 135°–150° C. followed by five minutes stoving under light pressure at 340°–350° C. In the production of these test samples, resin having particle sizes between 150–250 microns and below 150 microns was used.

"Shell Epikote 828" is described and identified in U.S. Patent 2,977,264, issued March 28, 1961; also, in Patent 2,943,009 and Patent 2,928,456. "Shell Epikote 1001" likewise is identified in Patent 2,977,264.

Various detailed examples of the manufacture of bearing materials and their application to backing materials will now be described.

The Examples 1 to 16 which follow utilise P.T.F.E. in granular form, and the processing is not intended necessarily to provide sufficient compaction and shearing forces to convert the P.T.F.E. into fibrous form, although in certain instances, it may be sufficient for some degree of conversion to take place. In the examples, the parts by weight and parts by volume are in corresponding c.g.s. units.

*Example 1*

Using Shell Epikote 828 and Shell Epikure D.D.M. in the ratio 100:27 pts. by weight, the mixture was made into a "B" stage resin as described above and was reduced to a particle size of less than 150 microns.

This reduced mixture was mixed by dry tumbling with P.T.F.E. "FLUON CD.1" in the proportion

```
                                          Parts by weight
"B" stage resin mix _____ 20
"FLUON CD.1" _____ 80
```

Lubricant was then added in the following proportions and was mixed by further tumbling:

```
"B" stage resin mix/FLUON CD.1 _____ gms__ 400
Shell Risella Oil _____ ml__ 116
Petroluem ether (B.P. 100°–120° C.) _____ ml__  20
```

The resulting lubricated polymer was then preformed into a cylindrical billet at about 500 lbs./sq. inch which was then transferred to the chamber of a ram extruder and extruded at 0.9"/min. to give a rod of approximately 5⁄16" diameter.

This was then calendered into tapes of 0.005", 0.010" and 0.020" thicknesses at 10–40 ft./min. The lubricant was then removed with carbon tetrachloride.

The strip was then pressed on to the surface of a shot blasted and degreased mild steel sheet at 2 tons/sq. in. for ten minutes at 135°–150° C. followed by 5 mins. stoving at 340°–350° C.

The composite strip was then made into washers to form thrust bearings.

*Example 2*

```
                                          Parts by weight
Shell Epikote Resin 828 _____ 100
Shell Epikure D.D.M. _____  27
Graphite powder _____  60
```

This mix was made into "B" stage resin as in Example 1 and disintegrated to 150–250 micron particle size.

20 pts. by weight of this resin mix were compounded with 80 pts. of FLUON CD.1 and processed as in Example 1 on to shot-blasted and degreased aluminium alloy strip.

The heat treated composite strip was then rolled to form cylindrical bushes.

*Example 3*

The "B" stage resin as in Example 2 was compounded as in Example 1 with "FLUON CD.1" in the proportion:

```
                                          Parts by weight
"B" stage resin mix _____ 40
"FLUON CD.1" _____ 60
```

After being tumbled, the mixture was fed into the nip of a sheeting mill producing a sheet 0.018″ thick which sheet was then pressed onto the surface of a shot blasted and degreased mild steel sheet at 1 ton/sq. in. for 3 minutes at 140° C. followed by 3 minutes at 200° C. follow by 3 minutes at 300° C. and finally 5 minutes at 350° C.

*Example 4*

Example 2 was repeated except that the 27 parts by wt. of Shell Epikure D.D.M. were replaced by 14.5 parts by wt. of Shell Epikure M.P.D.

*Example 5*

Example 2 was repeated except that the 60 parts by wt. of graphite powder were replaced by 60 parts by wt. of molybdenum disulphide.

*Example 6*

Example 2 was repeated except that the 60 parts by wt. of graphite powder were replaced by:
30 parts by wt. of molybdenum disulphide.
10 parts by wt. of short asbestos fibre.

*Example 7*

Example 5 was repeated except that the molybdenum disulphide content was raised to 127 parts by wt.

*Example 8*

| | Parts by wt. |
|---|---|
| Shell Epikote 828 | 100 |
| Shell Epikure Z | 20 |
| Molybdenum disulphide | 100 |

The MoS$_2$ was thoroughly dispersed in the epoxy resin at room temperature, after which the liquid "Epikure Z" curing agent was added again at room temperature. The resin mix was then poured into trays lined with cellophane sheet and heated for 10 minutes at approximately 100° C. to gel on cooling.

The "B" stage resin thus produced was disintegrated to particle size of less than 250 microns which was then compounded with FLUON CD.1 and processed as in Example 3 above.

*Example 9*

Example 3 was repeated except that the 27 parts by wt. of Shell Epikure D.D.M. were replaced by 5 parts by wt. of boron trifluoride.

In the preparation of the "B" stage resin it was necessary to heat the mixed ingredients for 1 hour at 100° C. to produce gelling on cooling.

The initial cure time of the composite bearing strip at 140° C. was increased to 15 minutes.

*Example 10*

Example 3 was repeated with the addition of 10% by volume of lead powder to the "B" stage resin mix before gelling.

*Example 11*

Example 5 was repeated with the addition of 15% by volume of lead coated copper powder to the "B" stage resin mix before gelling.

*Example 12*

Example 5 was repeated with the addition of 5% by volume of bronze powder to the "B" stage resin mix before gelling.

*Example 13*

| | | |
|---|---|---|
| "Bakelite Epoxide 201" | parts by wt | 100 |
| Boron-trifluoride/piperidine complex | do | 8.6 |
| Molybdenum disulphide | do | 50 |
| Asbestos powder | do | 5 |
| Lead powder | percent by volume | 5 |

The "B" stage resin was prepared as in Example 2. After disintegration to less than 250 microns the mix was compounded with FLUON CD.1 in the proportion

| | Parts by wt. |
|---|---|
| "B" stage resin mix | 55 |
| FLUON CD.1 | 45 |

The resulting product was processed as in Example 3.

*Example 14*

| | Parts by wt. |
|---|---|
| "Unox Epoxide 207" | 63.3 |
| Maleic anhydride | 30.0 |
| Trimethylol propane | 6.7 |
| Graphite | 30.0 |

The "B" stage resin was prepared as in Example 2 and was compounded with FLUON CD.1 and processed as in Example 3.

*Example 15*

| | Parts by wt. |
|---|---|
| "Shell Epikote 1001" | 100 |
| Shell Epikure D.D.M. | 10.5 |
| Molybdenum disulphide | 60 |
| FLUON CD.1 | 187 |

The "Shell Epikote 1001" solid resin was disintegrated to less than 250 microns particle size.

The resin powder was then tumbled with the D.D.M. powder until intimately mixed.

The MoS$_2$ was then added and dispersed, followed by the "FLUON CD.1."

The resultant mixture was then distributed evenly over one surface of a prepared metal sheet and pressed at ½ ton/sq. in. at 135° C. for 5 mins. followed by 10 mins. at 200° C. and finally 5 minutes at 350° C.

*Example 16*

A "B" stage resin was made as in Example 2. After disintegration to less than 250 microns particle size it was thoroughly blended with "FLUON G.1" P.T.F.E. powder in the proportion

| | Parts by wt. |
|---|---|
| "B" stage resin mix | 55 |
| "FLUON G.1" | 45 |

The resultant mixture was then distributed evenly over one surface of a prepared metal sheet and pressed and cured as in Example 15.

We have already mentioned that by the use of a suitable form of P.T.F.E. for example that sold under the trademark "FLUON CD.1" which is susceptible to such conversion to the fibrous form, it is a useful and economical method of production to carry out the conversion during the mixture of the P.T.F.E. with the epoxy resin.

In this form of production the epoxy resin may have fillers such as graphite or molybdenum disulphide or metal powders or reinforcement such as asbestos or metal fibres.

The compacting and shearing forces needed to produce the fibrous P.T.F.E. structure can be achieved in various ways: for example, the P.T.F.E./epoxy resin mixture can be passed to a Z-blade mixer or a roll mill: the temperature under which action is effected would be well below the sintering temperature of P.T.F.E. Before or after drying or gelling of the resin, the fibrous mass may be disintegrated through a coarse screen and moulded into a hard, wear resistant, low friction bearing material having good load-bearing properties without having subjected the material to the high temperature needed to sinter the P.T.F.E.

The only heat treatment necessary is that required to effect cure of the epoxy resin (which may be at room temperature with, for example, some epoxy resins). If desired, a final sintering treatment at 300–380° C. for the P.T.F.E. material may be employed.

The further Examples 17 to 21, which follow utilise "FLUON CD.1" which is converted during admixture with the matrix material from granular to fibrous form.

Example 17

| | Parts by volume |
|---|---|
| Shell Epikote 828 } | 56 |
| Shell Epikure DDM } | |
| Graphite powder | 12 |
| FLUON CD.1 | 32 |

The Epikote 828 resin and DDM hardener were mixed in the proportion of 27 parts by weight of DDM to 100 parts by weight of resin by the following method:

(a) The curing agent was heated to 80°–100° C. and an approx. equal weight of resin added, the two being thoroughly mixed.

(b) The rest of the resin was then added and mixed thoroughly. The resin mix was then transferred to a Z blade mixer and the graphite added and thoroughly dispersed. The FLUON CD.1 was then added and mixed for a further 10 mins. The completed mix was then transferred to a tray and left overnight for the resin to gel. It was then disintegrated through a 3/16″ screen. This produced a dry fibrous compound which could be moulded into slabs or shaped mouldings by the application of heat and pressure, e.g. 150° C. for 5–30 minutes, according to thickness at ½–2 tons/sq. inch.

Example 18

A dry fibrous compound was made, as in Example 17. This compound was then fed to the nip of a roll mill from which it emerged as a sheet approx. .020″ thick.

This sheet was then used to provide a low friction wear resistant surface to the face of:

(a) A shot blasted and degreased aluminium alloy or steel strip by pressing at ½ ton/sq. in. for 5 minutes at 150° C.

(b) A fabric reinforced phenolic laminate by laminating it directly to a ply or several plies of pre-impregnated and dried fabric and pressing the composite laminate at ¼–1 ton/sq. in. at 140°–160° C. for 5–30 minutes according to thickness, thus curing both the phenolic resin and the epoxy resin at the same time intimately bonding the whole structure together.

Example 19

| | Parts by volume |
|---|---|
| Shell Epikote 828/DDM | 46 |
| Graphite powder or flake | 12 |
| Lead powder | 10 |
| FLUON CD.1 | 32 |

This mixture was compounded and pressed as in Examples 17 and 18.

Example 20

Example 19 was repeated, except that the graphite was replaced by molybdenum disulphide.

Example 21

75 parts by weight of a liquid urethane polymer containing 4.0–4.3% of isocyanate groups were blended with 25 parts by weight of Epikote 828 resin and then degassed at 100° C.

20 parts by weight of 4,4′-methylene-bis-(2-chloroaniline) were melted at 100°–105° C. and quickly and thoroughly blended with the polymer mixture and cooled to room temperature.

The resultant gum was then compounded on a rubber mill with 40% by volume of FLUON CD.1 and moulded into machineable blocks or shaped mouldings at 500–1,000 lbs./sq. inch for 20 mins. at 140° C. followed by 4 hours stoving at 140° C.

A bearing material formed in accordance with this invention can readily be moulded into sections of the required shape or into sections which can readily be machined to the required shape: the material can moreover be bonded to a backing strip or sheet of metal such as steel which, together with the bonded material can be bent to the required shape, the epoxy resin providing an adequate bond to the metal without requiring the employment of a separate adhesive layer.

Alternatively the bearing material may be applied to any suitable backing, for example a reinforced plastics backing, or in the case where the bearing material is made in a flexible form to a textile, rubber, or other suitable flexible backing.

An advantage of the methods of this invention is that satisfactory bearings may be made in which the thickness of the surfacing material is kept low, of the order of 0.010″. This improves heat transfer and reduces cost. Bearings with thicker surface layers which may be suitable for special purposes may also be made if desired.

What we claim is:

1. A moulded composite bearing material made from powdered fluorocarbon resin and powdered epoxy resin and comprising said fluorocarbon resin firmly incorporated in a matrix of said epoxy resin in a cured state, the relative proportions of the fluorocarbon resin to matrix material and its distribution therein being such that the composite bearing material is susceptible to bonding to a support.

2. A moulded composite bearing material as defined in claim 1, wherein said fluorocarbon resin is P.T.F.E.

3. The bearing material defined in claim 2, in which the content of epoxy resin by weight amounts to from about 11 to about 40% of the weight of said composite bearing material.

4. A moulded composite bearing material as defined in claim 2, wherein said P.T.F.E. in said matrix is in sintered form.

5. A moulded composite bearing material as defined in claim 2, wherein said P.T.F.E. in said matrix is in converted fibrous form.

6. A method of producing the bearing material defined in claim 5, in which said P.T.F.E. in converted fibrous form is mixed with said epoxy resin and said mixture is heated to the curing temperature of said epoxy resin.

7. A method of producing the bearing material defined in claim 2, in which said P.T.F.E. is in granular form and is mixed with said epoxy resin and said mixture is heated to the curing temperature of said epoxy resin.

8. A method as claimed in claim 7, in which P.T.F.E. in granular form is subjected during the mixing process, to compacting and shearing forces at a temperature below its sintering temperature, whereby it is converted at least partly from granular to fibrous form during the admixing process.

9. A method of making a bearing material as claimed in claim 7, which includes the step of raising the bearing material during final curing to a temperature sufficient to sinter the P.T.F.E. content thereof.

10. A method as claimed in claim 7, of making the bearing material defined in claim 14, wherein said filler is incorporated in said bearing material at the time when said P.T.F.E. and said epoxy resin are being mixed together.

11. A method of producing a backed bearing comprising a backing material lined with the bearing material defined in claim 2, which comprises mixing said P.T.F.E. and said epoxy resin in substantially uncured state, applying the resulting mixture to said backing material and subjecting said mixture to heating at an elevated temperature appropriate for curing said epoxy resin to the B and C stages while in position on the backing.

12. A method of producing a backed bearing comprising a backing material lined with the bearing material defined in claim 2, which comprises curing said epoxy resin to the B stage, mixing said P.T.F.E and said partly cured epoxy resin, applying the resulting mixture to said backing material and subsequently heating said mixture so as to cure said epoxy resin to the C stage when in position on said backing.